United States Patent [19]

Lee et al.

[11] Patent Number: 4,731,349

[45] Date of Patent: Mar. 15, 1988

[54] PROCESS OF PRODUCING ALUMINA-TITANIUM CARBIDE CERAMIC BODY

[75] Inventors: Minyoung Lee; Lawrence E. Szala; Marcus P. Borom, all of Schenectady, N.Y.

[73] Assignee: General Electric Company, Schenectady, N.Y.

[21] Appl. No.: 769,041

[22] Filed: Aug. 26, 1985

[51] Int. Cl.$^4$ .................. C04B 35/10; C04B 35/56
[52] U.S. Cl. .................................. 501/87; 501/102; 501/127; 264/65
[58] Field of Search ............ 501/127, 102, 105, 103, 501/87; 264/65; 51/309

[56] References Cited

U.S. PATENT DOCUMENTS

| | | | |
|---|---|---|---|
| 3,033,694 | 5/1962 | Trent et al. | 501/127 OR |
| 3,542,529 | 11/1970 | Bergna et al. | 419/18 X |
| 3,580,708 | 5/1971 | Ogawa et al. | 51/309 X |
| 4,063,908 | 12/1977 | Ogawa et al. | 501/87 X |
| 4,218,253 | 8/1980 | Dworak et al. | 501/87 OR |
| 4,325,710 | 4/1982 | Tanaka et al. | 501/102 X |
| 4,356,272 | 10/1982 | Kanemitsu et al. | 501/87 OR |
| 4,366,254 | 12/1982 | Rich et al. | 501/87 X |
| 4,407,968 | 10/1983 | Lee et al. | 501/87 OR |
| 4,416,840 | 11/1983 | Lee et al. | 501/87 X |
| 4,490,319 | 12/1984 | Lee et al. | 501/96 X |
| 4,512,946 | 4/1985 | Brun et al. | 501/87 X |
| 4,515,746 | 5/1985 | Brun et al. | 501/93 X |
| 4,526,875 | 7/1985 | Yamamoto et al. | 501/87 OR |
| 4,539,141 | 9/1985 | Brun et al. | 501/87 X |
| 4,539,299 | 9/1985 | Brun et al. | 501/93 X |

OTHER PUBLICATIONS

CA 92:634736 "High Strength Ceramics with Improved Sinterability", Yamamoto et al, 8/14/79.
CA 96:109112w, "Titanium Carbide–Alumina Ceramics Containing Yttrium", Nippon Tungsten Co., Ltd., Nov. 2, 1981.
CA 96:109111v "Titanium Carbide–Alumina Ceramics Containing Yttrium", Nippon Tungsten Co., Ltd., Nov. 2, 1981.

*Primary Examiner*—Mark L. Bell
*Assistant Examiner*—Karl Group
*Attorney, Agent, or Firm*—Jane M. Binkowski; James C. Davis, Jr.; Paul R. Webb, II

[57] ABSTRACT

High-strength, fine-grain, multi-phase substantially crystalline sintered ceramic bodies are produced by a process comprising the steps of cold pressing, followed by sintering at a high temperature, of a mixture of different powdered ceramic materials containing non-inhibitory components and a source of inhibitory components that can chemically interact at elevated temperatures generate gases which hinder densification or form phases undesirable for sintering provided that there is also included in the mixture an amount of a source of a component co-reactive with the gases produced by the inhibitory components at elevated temperature to achieve efficient densification and retention of properties in the sintered body.

15 Claims, No Drawings

PROCESS OF PRODUCING ALUMINA-TITANIUM CARBIDE CERAMIC BODY

The invention relates to the provision of mixtures of powders and to methods using them to produce high-strength, fine-grain sintered ceramic bodies, useful, for example, as cutting tools.

BACKGROUND OF THE INVENTION

Although many ceramic materials have been proposed as cutting tools for various applications, and some of these materials such as sintered or hot pressed silicon nitride are used quite successfully for some applications, aluminum oxide-titanium carbide is generally recognized as the best all around ceramic tool material. Commercial tools of this type are known to be produced by expensive and cumbersome hot pressing; see, by way of illustration, Ogawa et al, U.S. Pat. No. 3,580,708; Bergna et al, U.S. Pat. No. 3,542,529; and Ogawa et al, U.S. Pat. No. 4,063,908. In Brun, Lee and Szala, U.S. Pat. No. 4,515,746, a particulate mixture of powders of metal hydride, carbon and relatively inert ceramic powder, e.g., alumina are hot pressed to form useful composites comprising, for example, alumina-TiC when alumina, titanium hydride and carbon are hot pressed. Several recent disclosures, however, have shown that ceramic composites, e.g., alumina-TiC composites, can be sintered to a closed pore state, either by using specific oxides as sintering additives, e.g., $Y_2O_3$ as in Kanemitsu et al, U.S. Pat. No. 4,356,272; Japanese Patent Publication 81,140,066 (Chem. Abs. 96:109112w) and Japanese Patent Publication No. 81,140,067 (Chem. Abs. 96:109111v); or by using titanium oxycarbide as in Japanese Patent Publication No. 79,103,407 (Chem. Abs. 92:63473b). Lee and Szala, U.S. Pat. Nos. 4,407,968 and 4,416,840 disclose sintering mixtures of aluminum oxide, carbon and elemental titanium or titanium hydride to composites having an $Al_2O_3$ phase and a substoichiometric TiC phase. A very recent development is to use a significantly higher heating rate for the sintering process than is used in conventional practice; see Lee, Borom and Szala, U.S. Pat. No. 4,490,319.

If the heating rate of the sintering cycle is increased significantly over the current industrial practice, as disclosed in the above-mentioned U.S. Pat. No. 4,490,319, a dense, high quality ceramic article will be produced. Unfortunately, however, most commercial furnaces cannot produce high heating rates. Therefore, implementation of the new high-heating-rate process requires a sizable capital investment which decreases the economic incentives for adopting this new technology. On the other hand, addition of oxide additives in sufficient quantity to promote sintering of the ceramic powdered material to high density can alter the properties of the end products and diminish the usefulness of both the process and the product. Therefore, a method or methods which can produce materials without requiring major changes in facilities is still very much in need. The present invention solves such a need by providing new chemical compositions which can be sintered to a closed pore product with desirable properties using heating rates within the range of current industrial facilities. Moreover, if desired, the powdered ceramic mixtures provided by this invention can also be effectively densified using a rapid rate process, e.g., that of the above-mentioned U.S. Pat. No. 4,490,319, to provide unexpected and desirable ultimate properties.

The following definitions are applicable to an understanding of this invention and/or the prior art:

SINTERING: development of strength and associated densification of a powder compact through the application of heat alone.

HOT PRESSING: the combined application of heat and of pressure applied through the action of a mechanical piston on the powder-filled cavity of a die. Under such conditions the pressure on the powder compact is non-uniformly applied due to die wall friction and the axial application of the piston force. Under proper conditions of temperature and pressure, densification of the compact can result.

HOT ISOSTATIC PRESSING (HIP): The simultaneous application of isostatic pressure and heat to a sample body whose porosity is to be reduced. Pressure is applied uniformly to the sample body by an inert gas. The sample body may be (a) a powder compact encapsulated in a gas impermeable, but deformable, envelope such as a tantalum foil can or a glass coating or (b) any solid substantially devoid of open porosity.

The sintered product of this invention is considered to be "substantially crystalline", because it is not atypical to encounter minor amounts of non-crystalline material (e.g. glasses) in the grain boundary phases.

This invention addresses a particularly troublesome problem encountered in the sintering of multiphase systems. Such systems frequently contain components, which will chemically interact at elevated temperatures and produce gases. If such chemical reaction proceeds fast enough to inhibit the desired densification or, if the nature of the reaction is such that it results in degradation of the system (i.e., undesirable solid, liquid or gaseous phases are produced), manufacture of the optimum product cannot be readily accomplished by sintering.

While not intending to be bound by any theory, it is believed that ceramic oxides, e.g., aluminum oxide, react with carbon or carbon-containing materials, e.g., titanium carbide, or the like, at temperatures exceeding about 1550° C., emitting gaseous materials which in turn hinder the consolidation of the mixture on further heating. Such problems seem to intensify if free carbon is introduced with the carbide or if the particle size of the powdered component in the mixture is reduced.

It has now been discovered that if an additional component is included, such problems will be minimized. Specifically, according to this invention there will be included in the ceramic powder an additive which will become an effective scavenger of the evolving gas phase from the reaction between alumina, for example, and carbon, or a source of carbon. Judiciously selected such additives will also provide enhanced properties in the sintered products.

Typical examples of the invention are the addition of small quantities of either zirconium hydride or hafnium hydride to a ceramic powder mixture, e.g., a mixture of alumina and titanium carbide, and the like. The hydrides stay relatively clean during the conventional powder processing stages, but decompose to highly reactive components at about 1000° C. This reactive metal forms oxides or carbides by reacting with the gaseous product evolving from the carbide-oxide or carbon-oxide reaction.

As a further advantage, small amounts of by-products, e.g., zirconium oxide or hafnium oxide, formed in the reaction, can also be retained in the high temperature phase to provide transformation toughening of the sintered product. In some cases, the resulting carbide from the process can dissolve into a carbide phase, for example, a titanium carbide phase, without detracting in any way from the desirable properties of the final product.

This invention is primarily described herein in respect to the $Al_2O_3$-TiC system, because this particular material system often presents the very problem in densification discussed herein above. However, the essential aspects of the sintering process disclosed herein are not dependent upon either the use of particular sintering additives, particular material proportions, or the nature of minor impurities. The process is expected to be broadly applicable to the sintering of powdered ceramic materials, that contain components which will chemically react at elevated temperatures to inhibit densification or degrade the system so that an undesirable sintered product results.

SUMMARY OF THE INVENTION

According to this invention, a mixture of powdered ceramic materials is consolidated under pressure to produce a cold pressed green compact of some preselected shape and volume, and the compact is heated to a maximum sintering temperature. The mixture contains non-inhibitory components, e.g., aluminum oxide, titanium carbide, and the like, and a source of inhibitory components, such as carbon or a carbon source, or an oxide or oxicarbide of a metal, such as titanium, magnesium, chromium, zirconium, hafnium, tungsten, or a mixture of any of the foregoing, the inhibitory components being capable of chemically interacting with the non-inhibitory components at elevated temperatures to generate gases which hinder densification or form phases undesirable for sintering. It is the essence of the invention to include in such mixtures an amount of a source of at least one component co-reactive with the inhibitory components at elevated temperatures to provide efficient densification and retention of properties in the sintered body.

In preferred aspects, the present invention contemplates the use of hot isostatic pressing after sintering; the use of ceramic mixtures comprising powdered aluminum oxide and powdered titanium carbide; and the use of additives comprising zirconium hydride, hafnium hydride or a mixture of such hydrides.

DETAILED DESCRIPTION OF THE INVENTION

The mixture of ceramic materials used in the present invention will vary widely in chemical type and proportions of ingredients used. In addition to the preferred combinations of aluminum oxide and titanium carbide, other components can be included or substituted, and the amounts varied. Merely by way of illustration, suitable starting powder mixtures, before addition of the additives of the invention can comprise:

aluminum oxide and titanium carbide, 50-50w/w, aluminum oxide and titanium carbide, 72-28w/w, aluminum oxide and zirconium oxide, 87.3-12.7w/w, aluminum oxide, titanium carbide and zirconium oxide, 63-30-7w/w, aluminum oxide and titanium nitride, 70-30w/w, aluminum oxide and 500 ppm of magnesium oxide, commercial grade yttrium oxide powder, and many others, ceramic oxides, like $HfO_2$, $BeO$, $Cr_2O_3$, $La_2O_3$, $ThO$, $UO_2$, $ZrO_2$, $BaZrO_3$, $BeZr_2O_7$, $ThO_2 \cdot ZrO_2$, and mixtures and solid solutions thereof. Also ceramic carbides, such as the carbides of boron, hafnium, niobium, tantalum, vanadium, zirconium and mixtures and solid solutions thereof. Still other useful components in the ceramic powders are the borides of hafnium, niobium, tantalum, titanium, vanadium, zirconium, and mixtures and solid solutions thereof. More specifically, representatives of the borides are $HfB_2$, $NbB$, $NbB_2$, $TaB$, $TaB_2$, $TiB_2$, $VB$, $VB_2$ and $ZrB_2$.

The proportions in the mixtures can vary within ranges well known to those skilled in this art. For example, the mixtures comprising alumina and titanium carbide most generally will be selected to provide products comprising 40 to 80% by weight of alumina and from about 20 to about 60% by weight of titanium carbide.

The amount of component effective to interact with the gas generating compound or gas used in the powdered mixture can vary rather widely, so long as at least enough is present to react with any inhibitory components present. Ordinarily this will range from about 0.5 to about 5 weight percent of the mixture, preferably from about 1 to about 2 weight percent. The components are introduced in conventional ways, e.g., by grinding or dry blending.

In addition to zirconium hydride and hafnium hydride, as additives there can be used the hydrides of niobium, tantalum, titanium, vanadium, mixtures thereof, and the like.

In carrying out the present process, a particulate homogeneous or at least a substantially homogeneous mixture or dispersion of ceramic powder and any sintering aid additive is formed. The components of the mixture or dispersion can be of commercial or technical grade. They can be admixed by a number of techniques such as, for example, ball milling, vibratory milling or jet milling, to produce a significantly or substantially uniform or homogeneous dispersion or mixture. The more uniform the dispersion, the more uniform is the microstructure, and therefore, the properties of the resulting sintered body.

Representative of these mixing techniques is ball milling, preferably with balls of material such as alpha-$Al_2O_3$ which has low wear and which has no significant detrimental effect on the properties desired in the final product. If desired, such milling can also be used to break down any agglomerates and reduce all materials to comparable particle sizes. Milling may be carried out dry or with the charge suspended in a liquid medium inert to the ingredients. Typical liquids include ethyl alcohol and carbon tetrachloride. Milling time varies widely and depends largely on the amount and particle size reduction desired and type of milling equipment. In general, milling time ranges from about 1 hour to about 100 hours. Wet milled material can be dried by a number of conventional techniques to remove the liquid medium. Preferably, it is dried by spray drying.

In the present dispersion or mixture the average particle size ranges from about 0.1 micron to about 5 microns. An average particle size less than about 0.1 micron is not useful since it is generally difficult or impractical to compact such a powder to a density sufficient for handling purposes. On the other hand, an average particle size higher than about 5 microns will not produce the best ceramic body. Preferably the average particle size of the mixture ranges from about 0.3 micron to about 1 micron.

A number of techniques can be used to shape the powder mixture into a compact. For example, it can be extruded, injection molded, die-pressed, isostatically pressed or slip cast to produce the compact of desired shape. Any lubricants, binders or similar materials used in shaping the powder mixture should have no significant deteriorating effect on the resulting sintered body. Such materials are preferably of the type which evaporate on heating at relatively low temperatures, preferably below 500° C., leaving no significant residue. The compact should have a density at least sufficient for handling purposes, and preferably its density is as high as possible to promote densification during sintering.

The compact is placed within a furnace and provided with a partial vacuum wherein the residual vapor has no significantly deleterious effect thereon. Ordinarily, a carbon furnace is used, i.e., a furnace fabricated from elemental non-diamond carbon. This partial vacuum is provided throughout the present heating step producing the present sintered body. Preferably, upon completion of sintering, the sintered body is furnace cooled to room temperature in this partial vacuum. The partial vacuum should be at least sufficient to remove from the furnace chamber, i.e., the environment or atmosphere enveloping the compact, any excess gas generated during the heating step which would have a significantly deteriorating effect on the compact. On the other hand, the partial vacuum should not be so high as to vaporize the compact to any significant portion, i.e., higher than about 10% by volume, or the residual vapor in the environment or atmosphere enveloping the compact at sintering temperature is an inert gas such as nitrogen, helium or argon. Preferably, such gas is present during the entire heating period. A number of conventional techniques can be used to introduce and maintain the inert gas in the residual vapor. For example, the gas can be leaked in using a needle valve.

The present sintering temperature ranges from about 1650° C. to about 1950° C. Ordinarily, sintering temperatures outside this range will no produce the present sintered body. For best results the sintering temperature ranges from about 1850° C. to about 1920° C.

The particular sintering time period to produce a sintered body having a minimum Rockwell A hardness of 92 or 91 depends largely on the sintering temperature and is determinable empirically with increasing sintering temperature requiring less sintering time. Generally, however, to produce the present sintered body having a minimum Rockwell A hardness of about 92 at a sintering temperature of about 1800° C., a suitable sintering time period is about 2 hours, and to produce the sintered body with a minimum Rockwell A hardness of about 91, the sintering time period at 1800° C. would be somewhat less, i.e., about 1 hour.

Generally, the present sintered body having a minimum Rockwell A hardness of 91 has an outside surface portion which is impermeable to gas. Ordinarily, the outside surface portion of the sintered body with a minimum Rockwell A hardness of 92 is impermeable to gas. One way of determining if the outside surface portion of the sintered body is impermeable to gas can be carried out by suspending the sintered body and immersing it in water or other liquid and determining whether the thus-suspended-immersed body shows any observable weight gain. If no weight gain is observed, then the sintered body will have attained closed porosity in its entire outer surface. Alternatively, the closed porosity can be determined by careful metallographic examination of polished sections of the sintered body.

The Rockwell A hardness of the present sintered body having an outside surface portion which is impermeable to gas, can be increased by subjecting it to hot isostatic pressing. Such hot isostatic pressing can be carried out in a conventional manner. For example, the sintered body can be compressed in a pressurized gaseous atmosphere under a pressure of at least about 5000 psi, generally from about 5000 psi to about 15,000 psi, at a temperature ranging from about 1350° C. to about 1750° C. producing a sintered body having a Rockwell A hardness of about 93 or higher. The gaseous atmosphere should have no significant deleterious effect on the sintered body. Representative gases suitable for providing the pressurized gaseous atmosphere include argon, nitrogen and helium.

Ordinarily the volume fraction of pores in the present product is less than about 5% by volume and usually less than 3% by volume of the product. All, or substantially all, of the pores are closed or non-interconnecting, and generally, they are less than about 1 micron in diameter. The pores are well distributed in the product and have no significant deleterious effect thereon.

The present invention makes it possible to reproducibly and economically fabricate complex shaped ceramic articles directly. The sintered product of this invention can be produced in the form of a useful, simple, complex or hollow shaped article without machining. The dimensions of the sintered product would differ from those of the green compact by the extent of dimensional change occurring during shrinkage. The $al_2O_3$-TiC system as sintered in the practice of this invention has particular utility in the preparation of tool inserts for machining operations.

DESCRIPTION OF THE PREFERRED EMBODIMENTS

The invention is further illustrated by the following examples. In each example the powders were prepressed isostatically to about 50 kpsi. The compact plugs so produced were processed in the dilatometer-equipped furnace. The furnace was evacuated to 50 millimicrons vacuum, helium was introduced and was allowed to purge the furnace at one atmosphere pressure during the rest of the cycle. Natural furnace cooling was relied upon to reduce the temperature to room temperature. Where values are indicated, material density was determined by immersion density measurement. In all examples, the sintered bodies had essentially no open pores. Microstructural observations were made in most instances.

EXAMPLE 1

Seventy grams of −325 mesh titanium carbide powder was placed in a tungsten carbide/cobalt ball mill along with acetone as a vehicle. The powder was milled for 120 hrs. to reduce the particles to submicron size. One-hundred eighty grams of 0.3 micron alumina powder and 5 grams of −325 mesh zirconium hydride powder were added to the milled titanium carbide powder. The mixture was milled for 72 hours, air dried and sieved through a 50 mesh screen. For comparison purpose a control batch of powder containing no zirconium hydride was prepared following the same procedure as stated above.

Specimens of the powders were pressed to shape in a ¾" square die at a pressure of approximately 1000 psi. The ⅜" thick specimens were further compacted by isostatic pressing at 52 kpsi ($10^3$ pounds per square inch) to a green density of 55% of theoretical.

The specimens were placed in a furnace and heated at a rate of 50° C./min. to 1950° C. in helium. Density of the fired specimens was determined by the immersion technique.

The sample according to this invention containing zirconium hydride achieved a density of 4.41 gm/cm$^3$ (98%) with no open porosity, while the sample without zirconium hydride, according to the prior art, only achieved a density of 3.71 (82%) with 15% open porosity. Both samples were then hot isostatically pressed at a temperature of 1525° C for 10 minutes at 15 kpsi gas pressure. The sample according to this invention, containing zirconium hydride, achieved essentially full density (4.50 gm/cm$^3$) with no porosity, while the sample without zirconium hydride, according to the prior art, experienced no change in density.

The hot isostatically pressed, composite made with zirconium hydride according to this invention, exhibits an extremely fine grained microstructure with essentially no residual porosity and a hardness of $R_a$ 94.5 (ASTM -18-74). X-Ray diffraction analysis indicates that the $ZrH_2$ additive was converted to tetragonal $ZrO_2$.

EXAMPLE 2

The procedure of Example 1 was repeated, but using instead the rapid heating rate process disclosed in U.S. Pat. No. 4,490,319. The pressed powder body containing zirconium hydride was fired in helium at a heating rate of 50° C/min. up to 1500° C. followed by 400° C./min. to 1950° C. The rapid rate sintered sample after hot isostatic pressing had an extremely fine-grained highly desirable microstructure and a density of 4.48 which is 99% of theoretical.

EXAMPLE 3

Specimens of the hot isostatically pressed material made with zirconium hydride in accordance with Example 2 were ground into $\frac{1}{2} \times \frac{1}{2} \times 3/16''$ cutting tools. These cutting tools were tested in cutting a nickel base superalloy at 600 surface feet per minute, at a 0.080 inch depth of cut and a 0.008 inch feed rate. The tool performance was highly acceptable and comparable to that of the best commercially available hot pressed $Al_2O_3$-TiC tools.

EXAMPLE 4

If the procedure of Example 1 is repeated, substituting hafnium hydride for the zirconium hydride, substantially the same results will be obtained.

The above-mentioned patents and publications are incorporated herein by reference.

The principles, preferred embodiments and mode of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the invention.

What is claimed is:

1. In a process of making a multi-phase, substantially crystalline, sintered ceramic body, consisting essentially of
   (i) preparing a mixture consisting essentially of 40% to 80% by weight aluminum oxide powder and from about 20% by weight to about 60% by weight titanium carbide powder,
   (ii) consolidating said mixture under pressure to produce a pressed powder body;
   (iii) heating said body in an unconfined state to at least a sintering temperature;
   (iv) holding said body at sintering temperature for a period at least sufficiently long enough to achieve uniform temperature distribution throughout the body; and
   (v) recovering said sintered body, the improvement which consists essentially of including in said mixture a member selected from the group consisting of zirconium hydride, hafnium hydride, niobium hydride, tantalum hydride, titanium hydride, vanadium hydride and a mixture thereof, said member ranging from about 0.5% by weight to about 5% by weight of said mixture and being present in an amount sufficient to produce a sintered body having a minimum Rockwell A hardness of 91, said sintering temperature ranging from about 1650° C. to about 1950° C., said sintering being carrried out in a partial vacuum or atmosphere which has no significantly deleterious effect thereon.

2. A process as defined in claim 1 wherein said member is zirconium hydride.

3. A process as defined in claim 1 wherein said member is hafnium hydride.

4. A process as defined in claim 1 wherein step (iii) is carried out in helium at a heating rate of 50° C./min. up to 1500° C. followed by 400° C./min. to 1950° C.

5. The process according to claim 1 wherein said sintering temperature ranges from about 1850° C. to about 1920° C.

6. A process for producing a sintered body having a minimum Rockwell A hardness of 91 which consists essentially of forming a mixture of aluminum oxide, titanium carbide and a metal hydride into a compact, said metal hydride being selected from the group consisting of zirconium hydride, hafnium hydride, niobium hydride, tantalum hydride, titanium hydride, vanadium hydride and mixture thereof, said metal hydride ranging from about 0.5% by weight to about 5% by weight of the total amount of said aluminum oxide and titanium carbide and being present in an amount sufficient to produce said sintered body, said titanium carbide ranging from about 20% by weight to about 60% by weight of the total amount of said aluminum oxide and titanium carbide, and sintering said compact in an unconfined state at a temperature ranging from about 1650° C. to about 1950° C., said sintering being carried out in a partial vacuum or atmosphere which has no significantly deleterious effect thereon.

7. The process according to claim 6 wherein said sintering temperature ranges from about 1850° C. to about 1920° C.

8. The process according to claim 6 wherein said metal hydride ranges from about 1% by weight to about 2% by weight.

9. The process according to claim 6 wherein said metal hydride is zirconium hydride.

10. The process according to claim 6 wherein said metal hydride is hafnium hydride.

11. A process for sintering an aluminum oxide-base powder to produce a sintered body having a minimum Rockwell-A hardness of 91 which consists essentially of forming said powder into a compact, said powder containing titanium carbide in an amount sufficient to impede densification of said compact with time at elevated temperature, said powder containing a metal hydride selected from the group consisting of zirconium hydride, hafnium hydride, niobium hydride, tantalum hydride, titanium hydride, vanadium hydride and a mixture thereof, said metal hydride ranging from about 0.5% by weight to about 5% by weight of the total amount of said aluminum oxide and titanium carbide powders and being present in an amount sufficient to enable production of said sintered body, and sintering said compact in an unconfined state at a temperature ranging from about 1650° C. to about 1950° C., said sintering being carried out in a partial vacuum or atmosphere which has no significantly deleterious effect thereon.

12. The process according to claim 11 wherein said sintering temperature ranges from about 1850° C. to about 1920° C.

13. The process according to claim 11 wherein said metal hydride ranges from about 1% by weight to about 2% by weight.

14. The process according to claim 11 wherein said metal hydride is zirconium hydride.

15. The process according to claim 11 wherein said metal hydride is hafnium hydride.

* * * * *